3,231,529
GASKET COMPOSITIONS COMPRISING POLYVINYL CHLORIDE AND VINYL ESTER INTERPOLYMERS
Hans H. Kuhn, Spartanburg, S.C., and Richard J. Haberlin, Weston, and Donald Goodman, Chestnut Hill, Mass., assignors to W. R. Grace & Co., Cambridge, Mass., a corporation of Connecticut
No Drawing. Filed Nov. 18, 1960, Ser. No. 70,112
7 Claims. (Cl. 260—23)

This invention relates to rubbery gel-type gasket compositions with self-lubricating properties, particularly suited for use as a seal in lug and screw caps. It is more particularly concerned with a plastisol derived gasket which provides lubrication between the gasket surface and the lip of the container in closures of the "roll-on" or "twist" type.

Rotatable closures for glass jars are becoming more popular, and there has been a need for gasketing material which will efficiently seal the pack and give good adhesion and impression, but nevertheless, permit easy cap removals.

A gasket composition for such caps must be tasteless, non-toxic, and odorless. It must be able to withstand various closing conditions; for example, cold close and hot close with or without steam, and varying turn-down forces without cutting through.

United States Patents Nos. 2,874,863 and 2,880,901 describe some of the problems encountered in the design of this type of closure and gasket material. The latter patent proposes the incorporation of polybutenes in gasket forming compositions as a lubricant. The polybutenes are said to migrate to the surface during gelling of the plastisol. Polybutenes, however, are highly incompatible with vinyl resin plastisols and extreme care must be used in formulating plastisols containing polybutenes. Also, polybutenes are thermoplastic and do not provide good lubrication at low temperatures in the order of 32° F. Paraffin wax has also been suggested as a lubricant, but a wax-containing composition must be aged to permit the wax to bloom to the surface. Wax is also crystalline and thus is generally a poor lubricant for cap gaskets. Both polybutenes and wax appear on the gasket surface before the capping operation, and they are nuisances inasmuch as they cause retention of dust and dirt particles.

The plastisol gasket forming composition of this invention comprises the customary base resin, a compatible plasticizer capable of solvating the resin at elevated temperatures, a liquid processing aid, and a lubricant or release agent soluble in the processing aid but largely incompatible with the resin and compatible plasticizer. The amount of the processing aid and lubricant exceeds the limit of their combined compatibility with the system, such that the lubricant will exude from the fluxed composition under pressure. The amounts of processing aid and lubricant used, however, are not so excessive, and their natures are such that they do not appear on the gasket surface when the gasket is relaxed or uncompressed. The polarity of the lubricant is such that the lubricant will not migrate until pressure forces it out of the composition.

The lubricant used is a non-volatile, normally viscous liquid interpolymer of a vinyl ester of a saturated $C_{10}$-$C_{24}$ aliphatic monocarboxylic acid. It is preferred to use interpolymers of two or more vinyl esters to achieve the desired physical properties at the least expense.

This invention is based on controlled lubricant migration. The liquid processing aid, which might also be called an incompatible plasticizer, in the plastisol system is not capable of solvating to any extent, or being solvated by, the base resin and its plasticizer. The vinyl polymer lubricant is largely solvated and carried by the processing aid, at least in the proportions of interest in forming the present compositions. The processing aid and accompanying lubricant fill and extend the spaces in the plastic matrix formed by the fluxing operation. An incompatible plasticizer in such a system tends to be squeezed out of the matrix, but unless a gross amount is used, the amount that will exude with time is negligible and the surface of the plastic remains dry and tack-free. When the degree of incompatibility imparted to the system is properly adjusted, as in the present invention, the incompatible materials exude from the matrix when the composition is compressed and are re-absorbed when the pressure is released, as water in a sponge. This is particularly advantageous because little or no lubricant is left on the rim of the jar when the closure is removed and the possibility of contamination is avoided. Also, the amount of exudation and lubrication obtained increases with increases in the compression of the gasket. Aging of the compositions of this invention to develop their lubricity properties is not necessary.

The plastisol basically consists of a matrix-forming vinyl chloride polymer in a solid, finely-divided form, carried or suspended in a compatible non-volatile plasticizer that will solvate the resin when the mixture is heated. The plasticizer itself may or may not cross-link or react with the polymer or itself when the composition is fluxed. The presence of a non-volatile incompatible plasticizer, broadly a liquid processing aid, that will solvate the lubricant, is essential to this invention. The plastisol may also contain the customary fillers, wetting agents, release agents, and pigments besides other complementary lubricants.

Examples of these different components that can be used in the compositions of this invention are:

Base polymer or resin—comprises 30 to 50 weight percent of plastisol, and consists of vinyl chloride homopolymers or copolymers thereof with up to 10 percent of an unsaturated ester. It has, preferably, a fusion point of 275 to 385° F., a density of 1.35 to 1.44 gr./cc. and a specific viscosity of 0.60 to 0.90 (ASTM No. D1243-58T).

Examples

100% polyvinyl chloride (Geon 121, or Pliovic VO)
94–95% vinyl chloride copolymerized with 5–6% vinyl acetate (Vinylite VYNV)
94–95% vinyl chloride copolymerized with 5–6% dibutyl maleate (Pliovic A0)

Compatible plasticizer—comprises 25 to 50 weight percent of plastisol, and preferably consists of a full ester of a di or tri basic acid, having no alphatic unsaturation and 14 to 36 carbon atoms per molecule. Examples are: dioctyl phthalate, acetyl tributyl citrate, and butyl phthalybutyl glycolate. Generally speaking, the plasticizer should be incapable of solvating the resin below 200° F. during the normal period of storage and handling of the mixture to any appreciable extent but should solvate the resin at a temperature somewhat above this, as is known in the art.

Liquid processing aid—comprises 5 to 10 weight percent of the composition and is in general, a normally liquid, non-volatile, oleaginous material having little or no compatibility with the polyvinyl chloride system, such as a paraffinic petroleum oil, an epoxidized glyceride or a polymeric ester. It may or may not be polar, depending on the composition of the system. Preferably, no more than 20 weight percent of the liquid processing aid will dissolve at fusion temperature in a vinyl chloride homopolymer having a fusion point in the range of 275 to 385° F. Examples are white mineral oil (Kremol) and epoxidized soybean oil.

*Fillers*—comprise 25 to 40 weight percent of the composition, and are the customary finely divided solids used in the industry such as calcium silicate (Wollastonite), calcium carbonate, and asbestos (Asbestine 3–X).

*Wetting agents*—comprise 0.25 to 1 weight percent of the composition, and consist of such known materials as glyceryl monooleate and lecithin.

*Pigments*—0.025 to 1.5 weight percent of such pigments as carbon black and titanium dioxide can be used.

*Viscosity control agents, complementary lubricants, etc.*—can be used in amounts of about 0 to 2 weight percent. Examples are sodium lauryl sulfonate, silicone oil (200 fluid), oleamide, and paraffin wax (131 wax).

The proportions of ingredients used depend upon the specific system and can vary fairly widely. The above proportions are simply indicative of preferred proportions. The vinyl ester polymer lubricant is used in an amount in the range of about 0.5 to 2.0 weight percent on the total system, which is about 15 to 20 weight percent on the liquid processing aid. The proportions of lubricant plus processing aid are sufficient to insure incompatibility with the system. This amount will vary with the nature, amount and relative proportions of the other components. It can readily be determined by preparing and simply testing samples. Generally speaking, no lubricant will be observed on the surface of the fluxed uncompressed composition but will appear when compression on the gasket surface exceeds about 10 pounds per square inch.

The lubricant is prepared by conventional solvent polymerization techniques using solvents such as benzene and toluene and free-radical producing initiators such as benzoyl peroxide, and gamma radiation. The reaction can be carried out at the refluxing temperature of the solvent. It is preferred to use a dilute system to avoid excessive cross-linking.

While select vinyl ester homopolymers can be used, many of them are unduly crystalline at low temperatures. The polymers used are generally water-white, viscous liquids at room temperatures. They are greasy firm to semi-solid materials at 32° F., and have viscosities (Brookfield) of 500 to 10,000 cps. at 212° F. The polymers are unaffected by temperatures up to 260° F. for times up to two hours. Their volatility is less than 1 percent off at 300° F. Their pH is about neutral and they have iodine numbers in the range of 1 to 5.

A higher vinyl ester of a saturated aliphatic acid is an essential monomeric component of the lubricant polymer. The ester can contain 10 to 24 carbon atoms. The aliphatic acids used may be branched or straight-chained. The saturated fatty acids are preferred. Particularly preferred esters are the caprate, laurate, myristate, and stearate. One member of this group of vinyl ester monomers is interpolymerized with at least one other member, with the molar ratio of one to the other being about 0.5/1 to 2/1. Also, it is preferred to interpolymerize the high vinyl esters with up to 70 mole percent, preferably 15 to 40 mole percent, of vinyl esters of the saturated aliphatic acids having two to six carbon atoms to lessen the cost of the lubricant and secure the desired properties. Vinyl acetate is particularly preferred. Minor amounts up to 10 mole percent of other types of monomers may be used to impart specific properties to the lubricant.

The plastisol gasket-forming composition is made up in a conventional manner using such mixing means as dispersing, milling, and masticating. The resin is preferably of such fineness as to pass entirely through a 200 mesh screen.

Examples

Several representative polymers and plastisol systems were made up and evaluated. The lubricants were prepared by polymerization in an aromatic solvent using a peroxide catalyst followed by precipitation in alcohol and stripping. Alcohol precipitation is not usually necessary, however, and the solvent can be removed by simple distillation or steam stripping.

More particularly, a tetrapolymer was obtained by interpolymerizing four vinyl esters in the following system:

[0.3% initially—0.1% after 8 hours]

| | Weight percent |
|---|---|
| Vinyl stearate | 17.4 |
| Vinyl laurate | 17.4 |
| Vinyl myristate | 9.5 |
| Vinyl acetate | 4.8 |
| Benzene | 50.5 |
| Benzoyl peroxide | 0.4 |

The polymerization was carried out at 163.4–198° F. for 24 hours and the product was then precipitated in methanol. The polymer was separated from the solvent by decanting, stripped initially at about 20 mm. and then with a vacuum pump at 2 mm. with the temperature not being greater than 194° F. The clear polymer obtained was then further stripped in a short contact time mechanical distillation apparatus at a temperature of 229–275° F. and a pressure of 9–13 microns. A polymer yield of 92 percent was obtained. The polymer contained less than 1 percent acid.

A terpolymer was made in an identical manner. The monomers used were vinyl acetate, vinyl laurate and vinyl stearate, in a molar ratio of 1/1/1. A yield of about 90 percent was obtained.

The terpolymer and tetrapolymer were then formulated into plastisol gasket-forming compositions. The base formulation used to prepare these compositions was:

BASE FORMULATION

| | Phr.[2] |
|---|---|
| PVC[1] paste grade resin (Geon 121) (80 parts). | |
| PVC general purpose resin (Geon 202) (20 parts). | |
| Wollastonite (calcium silicate) | 80.0 |
| Unslaked lime | 1.3 |
| Titanium dioxide | 3.0 |
| Dioctyl phthalate | 28.0 |
| Epoxidized soybean oil (Paraplex G–62) | 25.0 |
| Wetting agent (Lipal 5C) | 1.5 |
| Acetyl tributyl citrate (Citroflex A–4) | 25.0 |

[1] Polyvinyl chloride homopolymer.
[2] Parts by weight on basis of total resin equalling 100.

Different lubricants were added to this base formulation to make up several representative and comparative compositions. These compositions were then evaluated by being cast as rings on 70 mm. and 82 mm. Trio metal caps. About 1650 milligrams of gasket composition were used on each 70 mm. cap. The plastisol compositions were fluxed at a temperature of 395° F. for 1 minute. The caps were placed on bottles containing representative packs, using a 45 pound-inch turn-down torque. This amount of turn-down torque is some 6 to 10 pound-inches greater than that used in most commercial machines. The capped bottles were then stored for one week at room temperature or under refrigeration, and the caps were thereafter tested for their ease of removal.

The following table gives the results of tests of nine samples. The different lubricants added to the base formulation are indicated in the upper portion of the table and the torques necessary to remove the caps are indicated in the lower portion of the table. The values given are the average values of at least four samples in each case. For commercial use, the removal torque should be below about 65 pound-inches and generally above about 25 pound-inches at room temperature. While the primary concern is ease of removal at room temperature, the values for the removals at refrigerated temperatures are also given.

|  | This Invention |  |  |  |  |  | Comparative |  |  |
|---|---|---|---|---|---|---|---|---|---|
|  | A | B | C | D | E | F | G | H | I |
| Composition (wt. percent): | | | | | | | | | |
| Paraffin wax [1] |  |  | 1 | 1 | 2 | 2 | 3 | 3 | 1 |
| Silicone [2] |  |  |  |  |  |  |  | 0.75 | 0.75 |
| Oleamide [3] |  |  | 1 | 1 |  |  |  |  | 1 |
| Tripolymer | 2 |  | 1.7 |  | 1.7 |  |  |  |  |
| Tetrapolymer |  | 2 |  | 1.7 |  | 1.7 |  |  |  |
| Base Formulation | 98 | 98 | 96.3 | 96.3 | 96.3 | 96.3 | 97 | 92.25 | 97.25 |
| Removal Torques (lb.-in.): | | | | | | | | | |
| 72° F.: | | | | | | | | | |
| 70 mm | 45 | 39 | 39 | 35 | 44 | 47 | 100+ | 92 | 63 |
| 82 mm | 60 | 56 | 46 | 46 | 62 | 65 | 100+ | 100+ | 80 |
| 40° F.: | | | | | | | | | |
| 70 mm | 79 | 75 | 49 | 47 | 100+ | 98 | 100+ | 100+ |  |
| 82 mm | 98 | 96 | 66 | 55 | 100+ | 100+ | 100+ | 100+ |  |

[1] Eicosane.
[2] 200 Fluid—350 Centipoises viscosity at 77° F.
[3] Armid O.

It can be seen that the lubricant of this invention performs satisfactorily. It gives removal torques in the desired range at room temperature, whereas many of the other customarily used lubricants do not. It will also be noted that this invention permits relatively low removal torques at refrigerated temperatures to be obtained without adversely affecting the removal torques at room temperature. Formulations A and B contain about the maximum amount of the tripolymer and tetrapolymer that should be used for this particular system, as indicated by the 40° F. removals. Formulations C and D, however, were properly formulated and relatively low removal torques at 40° F. were easily obtained. The amount of lubricant used will, of course, vary somewhat for each system and these values are not to be taken as optimum values generally applicable to all systems.

Small amounts of additional or complementary lubricants can be used in these compositions. Such lubricants as lecithin, silicone oil, paraffin, or oleamide, can be used to impart specific properties needed for special applications. Silicone fluid is especially useful to control the flowage of the compositions when "flow-in" gasket forming equipment is used.

The low temperature removal torques for compositions G and H were high. The amount of wax used in these compositions was a little excessive and accounts for the low-temperature performances. These examples indicate that 2 weight percent wax is about the upper limit on the amount of complementary wax lubricant that should be used in these plastisol systems.

It will be apparent to those skilled in the art that the self-lubricating gasket compositions of this invention are useful in other applications where one wishes to obtain a pressure seal without gasket transfer, e.g., refrigerator door seals, automobile door gaskets, packing assemblies, and rubber washers. An excellent gasket for desk-type tobacco humidors has been prepared from this composition.

Having described this invention, what is sought to be protected by Letters Patent is succinctly set forth in the following claims.

We claim:

1. A non-volatile, normally viscous liquid addition polymer having a viscosity in the range of 500 to 10,000 cps. at 212° F. and consisting of the free-radical initiated solvent polymerization reaction product of at least two vinyl esters of saturated monocarboxylic fatty acids having 8 to 22 carbon atoms per molecule and a vinyl ester of a saturated monocarboxylic fatty acid having in the range of 2 to 6 carbon atoms per molecule, the molar ratio of one of the higher vinyl esters to the other being in the range of 0.5/1 to 2/1, and the mole percent of the lower vinyl ester being in the range of 15 to 40 percent, based on the total of said higher vinyl esters.

2. The polymer of claim 1 wherein the higher vinyl esters are vinyl stearate and vinyl laurate, and the lower vinyl ester is vinyl acetate.

3. The polymer of claim 1 wherein the higher vinyl esters are vinyl myristate, vinyl laurate, and vinyl stearate, and the lower vinyl ester is vinyl acetate.

4. A container closure comprising a cap adapted to be mechanically attached to a container opening and a rubbery gasket positioned therein to register with the lip of the container, said gasket comprising a plastisol of a vinyl chloride polymer containing an incompatible amount of about 5 to 10 weight percent of a non-volatile, normally liquid processing aid selected from the group consisting of a paraffinic petroleum oil and an epoxidized glyceride and 0.5 to 2.0 weight percent of a lubricant soluble in said liquid processing aid, said lubricant comprising a non-volatile normally viscous liquid interpolymer of at least two vinyl esters of a $C_8$ to $C_{22}$ saturated monocarboxylic aliphatic acid and vinyl ester of a saturated monocarboxylic fatty acid having 2 to 6 carbon atoms in the molecule.

5. A gasket-forming composition comprising a plastisol of a vinyl chloride polymer, 5 to 10 weight percent of a liquid non-volatile processing aid selected from the group consisting of a paraffinic petroleum oil and an epoxidized glyceride, and 0.5 to 2.0 weight percent of a lubricant soluble in said processing aid, the amount of said processing aid and lubricant exceeding the limits of their combined compatibility in the system and said lubricant consisting of a non-volatile, normally viscous liquid interpolymer of at least two vinyl esters of a $C_8$ to $C_{22}$ saturated monocarboxylic aliphatic acid and a vinyl ester of a saturated monocarboxylic fatty acid having 2 to 6 carbon atoms in the molecule.

6. The composition of claim 5 wherein said liquid processing aid is incompatible with the vinyl chloride system to the extent that no more than 20 weight percent will dissolve in the vinyl chloride polymer at the fusion temperature thereof.

7. The composition of claim 5 wherein said interpolymer is a free-radical solvent polymerization reaction product of at least two high vinyl esters of saturated monocarboxylic fatty acids having 8 to 22 carbon atoms per molecule and up to 70 mole percent based on total higher vinyl esters of a vinyl ester of an aliphatic monocarboxylic acid having in the range of 2 to 6 carbon atoms per molecule.

References Cited by the Examiner

UNITED STATES PATENTS 2,118,864    5/1938    Reppe et al. _____ 260—85.7
2,475,557    7/1949    Swern et al. _____ 260—85.7

(Other references on following page)

UNITED STATES PATENTS

| | | | |
|---|---|---|---|
| 2,600,384 | 6/1952 | Bauer et al. | 260—85.7 |
| 2,600,385 | 6/1952 | Bauer et al. | 260—85.7 |
| 2,852,482 | 9/1958 | Graham | 260—23 X |
| 2,874,863 | 2/1959 | Unger et al. | 260—23 X |
| 2,880,901 | 4/1959 | Zipper et al. | 215—40 |
| 2,965,598 | 12/1960 | Birum et al. | 260—31.8 |
| 2,978,468 | 4/1961 | Hampton | 260—407 |
| 2,980,643 | 4/1961 | Edelman et al. | 260—31.8 |
| 3,142,401 | 7/1964 | Foss et al. | 215—40 |

OTHER REFERENCES

Swern et al., Journal of the American Chemical Society, vol. 70 (1948), pp. 2334–2339.

Port et al., Journal of Polymer Science, vol. 7 (1951), pp. 207–219.

LEON J. BERCOVITZ, *Primary Examiner.*

EARL J. DRUMMOND, MILTON STERMAN,
*Examiners.*